United States Patent [19]

Havinga et al.

[11] 3,862,211
[45] Jan. 21, 1974

[54] ULTRAVIOLET LIGHT AND HEAT STABILIZERS

[75] Inventors: Reginoldus Havinga, Schalkhaar; Pieter Dirk Swaters, Lochem, both of Netherlands

[73] Assignee: Koninklijke Industrieele Maatschappij, Noury & Van Der Lande N.V. Deventer, Netherlands

[22] Filed: Sept. 21, 1970

[21] Appl. No.: 74,127

[30] Foreign Application Priority Data
Oct. 2, 1969  Netherlands.................. 6914886

[52] U.S. Cl....... 260/476 R, 260/48.85, 260/465 D, 260/471 R, 260/473 R, 260/475 PN, 260/479 R
[51] Int. Cl............................................. C07c 69/78
[58] Field of Search.................. 260/476 R, 475 PN

[56] References Cited
UNITED STATES PATENTS
3,579,561   5/1971   Meltsner........................... 260/476

OTHER PUBLICATIONS
Migrdichian, "Organic Synthesis," Vol. 1, 1957, pages 319 and 320.

*Primary Examiner*—Lorraine A. Weinberger
*Assistant Examiner*—Paul J. Killos
*Attorney, Agent, or Firm*—Clelle W. Upchurch

[57] ABSTRACT

Compounds are disclosed having the general formula:

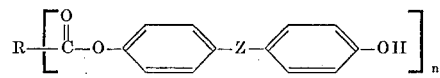

wherein Z represents a sulfonyl group, an alkylidene group or a cycloalkylidene group having from three to eight carbon atoms, $n$ being 1 or 2 and, when $n = 1$, R is an $\alpha, \beta$-unsaturated alkyl group having from two to four carbon atoms, a non-substituted phenyl group, or a substituted phenyl group having a substituent selected from an alkyl group having from one to six carbon atoms, an alkoxy group having from one to four carbon atoms, a halogen atom, or an amino, N-substituted amino, nitro, aryloxy or cyano group and, when $n = 2$, R is phenylene. They are useful as ultraviolet light and heat stabilizers for polyvinyl chloride and the like.

6 Claims, No Drawings

ULTRAVIOLET LIGHT AND HEAT STABILIZERS

The present invention relates to ultraviolet light and heat stabilizers, that is, compounds capable of stabilizing polymers against the effects of ultraviolet light and of heat, and provides a new class of such compounds and also processes for their preparation. The invention also relates to compositions comprising halogen-containing polymers, and particularly polyvinyl chloride, stabilized by means of the new class of compounds according to the invention.

It is well known that halogen-containing polymers, such as polyvinyl chloride, polyvinylidene chloride, and copolymers of vinyl chloride with other monomers such as vinyl acetate or vinylidene chloride, may undergo degradation under the influence of ultraviolet light and heat; this degradation takes the form of deterioration of the physical properties and/or of the color of the polymers.

It has now been discovered, in accordance with the present invention, that this degradation may be reduced or avoided by incorporating in the polymers a stabilizing amount of one or more previously unknown compounds having the general formula:

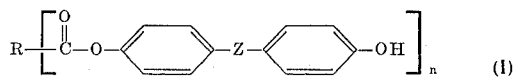   (I)

wherein Z represents a sulfonyl group, an alkylidene group or a cycloalkylidene group having from three to eight carbon atoms, n being 1 or 2 and, when n = 1, R is an α, β-unsaturated alkyl group having from two to four carbon atoms, a non-substituted phenyl group, or a substituted phenyl group having a substituent selected from an alkyl group having from one to six carbon atoms, an alkoxy group having from one to four carbon atoms, a halogen atom, or an amino, N-substituted amino, nitro, aryloxy or cyano group and, when n = 2, R is phenylene.

In published Dutch Pat. application No. 6,401,040, the addition of di-esters of di-phenols as stabilizers to polymers is described. However, the novel compounds according to the present invention differ chemically from the compounds described in this published Application. Moreover, those previously known compounds have no heat stabilizing power, in contrast to the novel compounds according to the present invention.

Examples of novel compounds according to this invention are listed below; these compounds are referred to, for convenience, by the appended numbers in the following description:

1. 2-(4-hydroxyphenyl)-2-(4-benzoyloxyphenyl)propane
2. 2-(4-hydroxyphenyl)-2-[4-(4-chlorobenzoyloxy)phenyl]propane
3. 2-(4-hydroxyphenyl)-2-[4-(3-isopropylbenzoyloxy)phenyl]propane
4. 2-(4-hydroxyphenyl)-2-[4-(2-methoxybenzoyloxy)phenyl]propane
5. 2-(4-hydroxyphenyl)-2-(4-methacryloyloxyphenyl)propane
6. bis{4- α-(4-hydroxyphenyl)isopropyl}phenyl]-terephthalate
7. 2-(4-hydroxyphenyl)-2-[4-(4-aminobenzoyloxy)phenyl]propane
8. 2-(4-hydroxyphenyl)-2-[4-(4-N-acetylaminobenzoyloxy)phenyl]propane
9. 4-hydroxyphenyl-4-benzoyloxyphenyl sulfone
10. 2-methyl-4-(4-hydroxyphenyl)-4-(4-benzoyloxyphenyl)pentane
11. 2-(4-hydroxyphenyl)-2-[4-tert.butylbenzoyloxy)phenyl]propane
12. 2-(4-hydroxyphenyl)-2-[4-(4-nitrobenzoyloxy)phenyl]propane
13. 2-(4-hydroxyphenyl)-2-[4-(2-phenoxybenzoyloxy)phenyl]propane
14. 2-(4-hydroxyphenyl)-2-[4-(4-cyanobenzoyloxy)phenyl]propane
15. 1-(4-hydroxyphenyl)-1-[4-(4-chlorobenzoyloxy)phenyl]cyclohexane.

The compounds according to the present invention may be prepared by reacting a compound of the general formula:

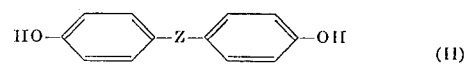   (II)

wherein Z has the meaning defined above, with an alkaline reagent such as metallic sodium, sodium hydroxide, potassium hydroxide, sodium carbonate or potassium carbonate. Subsequently, in order to obtain the novel compounds according to the invention, the mono-alkali phenoxide thus formed is reacted with a mono- or dicarboxylic acid or with a mono- or dicarboxylic acid chloride. These reactions may be carried out in an organic solvent, such as benzene, chloroform, carbon tetrachloride, diethyl ether, ethylene glycol dimethyl ether, dioxane or pyridine.

According to another aspect of this invention, the novel compounds according to the invention may be prepared in a more simple and more rapid way, which is technically and economically advantageous, in one reaction step by reacting in water the aromatic mono- or dicarboxylic acid chloride with the diphenol according to Formula (II), preferably in the presence of a water-soluble alkaline compound, such as sodium hydroxide, potassium hydroxide, ammonium hydroxide, sodium carbonate, potassium carbonate or sodium bicarbonate.

In order to obtain high yields of the compound desired, the reaction may be advantageously carried out in the presence of a water-miscible organic solvent, such as dioxane, ethylene glycol dimethyl ether, acetone, dimethyl sulphoxide and/or a surfaceactive compound and/or a quaternary ammonium salt, taking care that during the reaction the pH ranges from 8 to 12. The pH adjustment is dependent on the particular reagents to be used.

As reaction components, one may employ bisphenol-A; 2-methyl-4,4-bis(4-hydroxyphenyl)pentane; bis(4-hydroxyphenyl) sulfone; 1,1-bis(4-hydroxyphenyl)cyclohexane; benzoic acid; o-methoxybenzoic acid; p-tert.butyl-benzoic acid; m-isopropylbenzoic acid; p-chlorobenzoic acid; p-nitrobenzoic acid; terephthalic acid; isophthalic acid; methacrylic acid; p-aminobenzoic acid; p-cyanobenzoic acid; o-phenoxybenzoic acid; or the acid chlorides derived from these acids. These acid chlorides may be obtained in per se known manner by reacting the corresponding acids with chlorinating agents, such as POCl₃, PCl₃, PCl₅ or SOCl₂.

The novel compounds according to the present invention may be incorporated in the polymers and, if desired, in the presence of other additives such as plasticizers, heat stabilizers, anti-oxidants, lubricants and pigments, by per se known techniques such as roller mixing. They are preferably incorporated in the polymer in amounts of 0.1 – 5% by weight, based on the polymer.

The following examples illustrate the invention. Where reference is made to characteristic infrared absorption bands, these are expressed in microns.

EXAMPLE I 68.4 g of bisphenol-A, 22.2 g of caustic soda and 10 ml of a 5% emulsifier solution (Tergitol AN-4) were dissolved in 250 ml of water and 50 ml of acetone. 28.1 g of benzoyl chloride were added to this reaction mixture at 0° C. in 1 hour. After stirring for 30 minutes, the final product was filtered off and recrystallized from a mixture of ethanol and water in a ratio of 1:1.

55.2 g of compound (1) were obtained, having the formula:

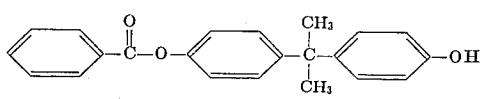

| | |
|---|---|
| Yield | 85% |
| M.P. | 151°–153°C. |
| Charact. IR abs. | (OH band 2.88 |
| | (C=O band 5.88 |

Starting from bisphenol-A and p-chloro-benzoyl chloride, and proceeding in an analogous way, compound (2), a semi-solid product, was obtained, having the formula:

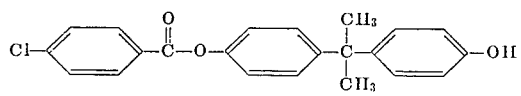

Charact. IR abs.:
   OH band............ 2.92
   C=O band........... 5.84

EXAMPLE II 68.4 g of bisphenol-A and 10 ml of a 5% emulsifier solution (Tergitol AN-4) were dissolved in 250 ml of water and 50 ml of acetone. NaOH solution was added to the reaction mixture until the pH was 10.5. Subsequently 28.1 g of benzoyl chloride were added to this reaction mixture at 0° C. in 1 hour, while maintaining the pH between 10.5 and 11.0 by adding 4 N NaOH solution regularly. After stirring for 30 minutes, the final product was filtered off and recrystallized from a mixture of ethanol and water in a ratio of 1:1.

57.8 g of compound (1) were obtained; yield 89%.

Starting from bis(4-hydroxyphenyl)sulfone and benzoyl chloride, and proceeding in an analogous way, compound (9) was obtained, having the formula:

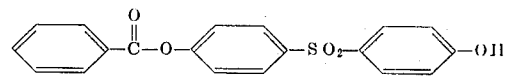

M.P. (°C.)_____ 182-184
Charact. IR abs.:
   OH band............ 3.00
   C=O band........... 5.79

EXAMPLE III 4.6 g of metallic sodium were dissolved in about 250 ml of ethanol. 45.6 g of bisphenol-A were added to this solution. After the alcohol had been distilled off under reduced pressure, 50 g of monosodium-phenoxide of bisphenol-A were obtained.

35.0 g of p-chlorobenzoyl chloride were added to a suspension of the sodium phenoxide thus obtained in 300 ml of dry benzene. The reaction mixture was refluxed for 2 hours. After washing with water and a bicarbonate solution and after the solvent had been distilled off, the final product was incorporated in ethanol. After the ethanol had been evaporated, 46.8 g of compound (2) were obtained as a liquid; yield 64%.

Starting from various diphenols and carboxylic acid chlorides as listed below in Table 1A, and proceeding in an analogous way, the compounds listed in Table 1B were obtained having the general formula:

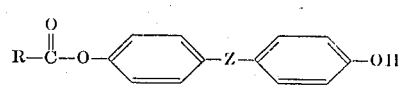

TABLE 1A

| acid chloride | diphenol | Compound No. |
|---|---|---|
| m-isopropylbenzoyl chloride | bisphenol-A | (3) |
| o-methoxybenzoyl chloride | bisphenol-A | (4) |
| methacryloyl chloride | bisphenol-A | (5) |
| p-aminobenzoyl chloride | bisphenol-A | (7) |
| benzoyl chloride | 2-methyl-4,4 bis(4-hydroxyphenyl)pentane | (10) |
| p-tert.butylbenzoyl chloride | bisphenol-A | (11) |
| p-nitrobenzoyl chloride | bisphenol-A | (12) |
| o-phenoxybenzoyl chloride | bisphenol-A | (13) |
| p-cyanobenzoyl chloride | bisphenol-A | (14) |
| p-chlorobenzoyl chloride | 1,1-(4-hydroxyphenyl) cyclohexane | (15) |

TABLE 1B

| Compound No. | R | Z | physical constants | charact. IR abs. bands | |
|---|---|---|---|---|---|
| (3) | 3-(CH₃)₂CH.C₆H₅ | C(CH₃)₂ | semi-solid product | OH | 2.85 |
| | | | | C=O | 5.80 |
| (4) | 2-CH₃O.C₆H₄ | C(CH₃)₂ | semi-solid product | OH | 2.86 |
| | | | | C=O | 5.80 |
| (5) | H₂C:C(CH₃) | C(CH₃)₂ | semi-solid product | OH | 2.85 |
| | | | | C=O | 5.80 |
| | | | | C=C | 6.09 |
| (7) | 4-H₂N.C₆H₄ | C(CH₃)₂ | M.P. 195°–210°C. | OH | 2.94 |
| | | | | C=O | 5.90 |
| (10) | C₆H₅ | (H₃C)C.CH₂CH(CH₃)₂ | $n_D^{20}=1.5670$ | OH | 2.90 |
| | | | | C=O | 5.82 |

TABLE 1B – Continued

| Compound No. | R | Z | physical constants | charact. IR abs. bands | |
|---|---|---|---|---|---|
| (11) | 4-(CH$_3$)$_3$C.C$_6$H$_4$ | C(CH$_3$)$_2$ | semi-solid product | OH C=O | 2.90 5.88 |
| (12) | 4-O$_2$N.C$_6$H$_4$ | C(CH$_3$)$_2$ | M.P. 218°–220°C. | OH C=O | 2.88 5.80 |
| (13) | 2-C$_6$H$_5$O.C$_6$H$_4$ | C(CH$_3$)$_2$ | semi-solid product | OH C=O | 2.90 5.80 |
| (14) | 4-NC.C$_6$H$_4$ | C(CH$_3$)$_2$ | semi-solid product | OH C=O C N | 2.95 5.90 4.48 |
| (15) | 4-Cl.C$_6$H$_4$ | C(CH$_2$)$_5$ | M.P. 145°–148°C. | OH C=O | 2.90 5.80 |

EXAMPLE IV 3.47 g of compound (7), obtained as described in Example III, were dissolved in 100 ml of a mixture of butyl acetate and dioxane in a ratio of 1:1. Ketene was passed into this solution at 30°C. for 20 minutes. After the solvents had been distilled off, the final product was recrystallized from a mixture of chloroform and hexane in a ratio of 1:1.

3.15 g of compound (8) were obtained, having the formula:

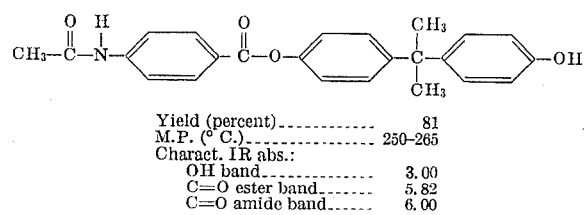

Yield (percent) .............. 81
M.P. (° C.) ............... 250–265
Charact. IR abs.:
  OH band ............... 3.00
  C=O ester band ........ 5.82
  C=O amide band ....... 6.00

EXAMPLE V 22.8 g of bisphenol-A were dissolved in 100 ml of ethylene glycol dimethyl ether. Then 2.3 g of metallic sodium were added to this solution. After the sodium had been reacted, a solution of 10.15 g of terephthaloyl chloride in 50 ml of ethylene glycol dimethyl ether was added. Subsequently the reaction mixture was heated at 85°C. for 6 hours. After pouring into water, the final product was filtered off, washed with water and a bicarbonate solution, and recrystallized from a mixture of acetone and chloroform in a ratio of 1:1.

18.5 g of compound (6) were obtained, having the formula:

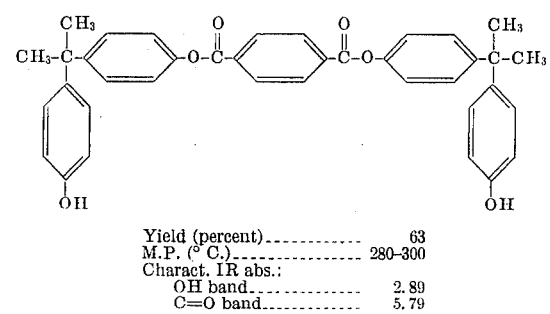

Yield (percent) .............. 63
M.P. (° C.) ............... 280–300
Charact. IR abs.:
  OH band ............... 2.89
  C=O band .............. 5.79

EXAMPLE VI 100 g of polyvinyl chloride, 35 g of dioctyl phthalate, 2 g of a commercially available barium-cadmium stabilizer (Estabex BC-148), which is a barium-cadmium-laurate-myristate mixture, and 200 mg of compound (2) were mixed on a roll mixer at 180° C. until a colorless, homogeneous, transparent sheet was obtained. This sheet was pressed to a uniform thickness of 0.2 mm. One part of this sheet was subjected to ultraviolet radiation in a Xenotester for 2,000 hours. Next, the degradation was determined visually and rated on a numerical scale ranging from 0 to 6, wherein the value 0 indicates that no degradation had taken place.

Another part of the sheet was subjected to a heat-test at 170° C. The heat-stability may be distinguished by "early color" and "long-term stability." The first indicates the number of minutes after which discoloration of the sheet takes place at a certain temperature, i.e., 170° C.; the second indicates the number of minutes after which complete degradation takes place at the same temperature.

In an analogous way, the ultraviolet and heat stabilizing power in polyvinyl chloride of other compounds according to the present invention was determined.

The compounds used and the degradations measured are as follows:

TABLE 2

| Compound | UV-stab. degradation | Heat-stability at 170°C., in min. | |
|---|---|---|---|
| | | early color | long-term stability |
| blank | 6 | 50 | 90 |
| (1) | 2 | 90 | 270 |
| (2) | 1 | 90 | >290 |
| (3) | 1 | 90 | >290 |
| (4) | 1 | 90 | >290 |
| (5) | 4 | 90 | >290 |
| (6) | 1 | 90 | 270 |
| (10) | 2 | 70 | >230 |
| (11) | 3 | 70 | >230 |

What is claimed is:

1. A compound having the general formula:

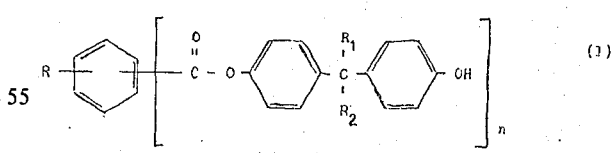

wherein R$_1$ and R$_2$ are lower alkyl groups or together form a cycloalkyl group, $n$ being 1 or 2; and, when $n = 1$, R is hydrogen, an alkyl group having from 1–6 carbon atoms, or a halogen atom and, when $n = 2$, R is hydrogen.

2. A compound as defined in claim 1, said compound being 2-(4-hydroxyphenyl)-2-(4-benzoyloxyphenyl)-propane.

3. A compound as defined in claim 1, said compound being 2-methyl-4-(4-hydroxyphenyl)-4-(4-benzoyloxyphenyl)pentane.

4. A compound as defined in claim 1, said compound being 2-(4-hydroxyphenyl)-2-[4-(tert.butylbenzoyloxy)phenyl]propane.

5. A compound as defined in claim 1, said compound being 2-(4-hydroxyphenyl)-2-[4-(4]chlorobenzoyloxy)-phenyl]propane.

6. A compound as defined in claim 1, said compound being 2-(4-hydroxyphenyl)-2-[4-(3-isopropylbenzoyloxy)phenyl]propane.

* * * * *